(12) United States Patent
Zhou et al.

(10) Patent No.: US 10,140,012 B2
(45) Date of Patent: Nov. 27, 2018

(54) INPUT IDENTIFICATION METHOD AND INPUT APPARATUS

(75) Inventors: Xiaoyu Zhou, Beijing (CN); Xiaobing Guo, Beijing (CN)

(73) Assignees: LENOVO (BEIJING) CO., LTD., Haidian District, Beijing (CN); BEIJING LENOVO SOFTWARE LTD., Haidian District, Beijing (CN)

( * ) Notice: Subject to any disclaimer, the term of this patent is extended or adjusted under 35 U.S.C. 154(b) by 0 days.

(21) Appl. No.: 13/994,259

(22) PCT Filed: Dec. 9, 2011

(86) PCT No.: PCT/CN2011/083768
§ 371 (c)(1),
(2), (4) Date: Jul. 24, 2013

(87) PCT Pub. No.: WO2012/079489
PCT Pub. Date: Jun. 21, 2012

(65) Prior Publication Data
US 2013/0293503 A1    Nov. 7, 2013

(30) Foreign Application Priority Data
Dec. 14, 2010    (CN) .......................... 2010 1 0603735

(51) Int. Cl.
*G06F 3/0488* (2013.01)

(52) U.S. Cl.
CPC ................. *G06F 3/04883* (2013.01)

(58) Field of Classification Search
CPC . G06F 3/04883; G06F 3/04882; G06F 3/0482
See application file for complete search history.

(56) References Cited

U.S. PATENT DOCUMENTS 5,809,267 A * 9/1998 Moran et al. .................. 715/863
6,094,197 A * 7/2000 Buxton et al. ................. 715/863
(Continued)

FOREIGN PATENT DOCUMENTS

| CN | 1504950 | 6/2004 |
| CN | 101086693 | 12/2007 |
| CN | 101339489 | 1/2009 |

OTHER PUBLICATIONS

Berlin, D., "Radian—Radial Launcher," —Video retrieved from http://vimeo.com/7631175, Published: Nov. 15, 2009.*
(Continued)

*Primary Examiner* — Latanya Bibbins
(74) *Attorney, Agent, or Firm* — Brinks Gilson & Lione; John C. Freeman

(57) ABSTRACT

An input apparatus having a touch module and an input identification method applied to the apparatus are described. The method includes during the collection of a touch track on the touch module, when a first partial track of the touch track satisfies a first preset condition, a first command corresponding to the first partial track is obtained; the first command is executed; and during the collection of the touch track, when a second partial track following the first partial track satisfies a second preset condition, a second command corresponding to the second partial track is obtained; and the second command is executed. The method and apparatus can quickly identify a gesture operation of a user on the touch screen, and can continue to perform the corresponding operation after the identification of the gesture operation of the user and before the completion of the gesture operation.

10 Claims, 3 Drawing Sheets

(56) References Cited

U.S. PATENT DOCUMENTS

| | | | |
|---|---|---|---|
| 7,603,633 B2* | 10/2009 | Zhao | G06F 3/04883 |
| | | | 715/834 |
| 2009/0079700 A1 | 3/2009 | Abernathy | |
| 2011/0066981 A1* | 3/2011 | Chmielewski | G06F 3/0482 |
| | | | 715/834 |

OTHER PUBLICATIONS

Berlin, D., "Radian—Radial Launcher," —Video screenshots retrieved from http://vimeo.com/7631175, Published: Nov. 15, 2009.*
PCT/CN2011/083768 International Search Report dated Mar. 8, 2012 (4 pages including 6 page English translation).
PCT/CN2011/083768 International Preliminary Report on Patentability dated Jun. 18, 2013 (10 pages).
Chinese First Office Action with English Translation for related Application No. 2010106037355 dated Apr. 11, 2014, 10 pages.
Chinese Second Office Action with English Translation for related Application No. 2010106037355 dated Sep. 23, 2014, 9 pages.

* cited by examiner

INPUT IDENTIFICATION METHOD AND INPUT APPARATUS

This application claims priority to International Application No. PCT/CN2011/083768 filed Dec. 9, 2011 and to Chinese Patent Appln. CN201010603735.5 filed Dec. 14, 2010, the entire contents of each are incorporated herein by reference.

The present disclosure relates to a technical field of input apparatus, in particular to an input identification method and an input apparatus.

BACKGROUND

In an embedded apparatus, it is an increasingly common to take a touch screen as an input apparatus. As a result, more designs can enable a user to replace original keys operations by some simple gestures. Besides standard five keys (including Up Arrow, Down Arrow, Left Arrow, Right Arrow and OK Key), there are some special continuous actions in applications, such as a long press operation on original keys, so as to achieve a continuous control of the apparatus. For example, a long press of Up Arrow can make the present screen to continue scrolling upwards.

In a process of implementing the present disclosure, the inventor finds at least the following problems existing in the prior art.

In the prior art, in a handheld terminal device having a touch screen, a gesture operation of the user cannot be quickly identified.

SUMMARY

A technical problem to be solved in the present disclosure is to provide an input identification method and an input apparatus that can quickly identify a gesture operation of a user on the touch screen of the input apparatus, and can continue to perform corresponding operation after the identification of the gesture operation of the user and before the completion of the gesture operation.

In order to solve the technical problem, embodiments of the present disclosure provide the below technical solutions:

On one hand, provided is an input identification method applied to an input apparatus having a touch module, and the method comprises:

during a collection of a touch track on the touch module, when a first partial track of the touch track satisfies a first preset condition, obtaining a first command corresponding to the first partial track;

executing the first command;

during the collection of the touch track, when a second partial track following the first partial track satisfies a second preset condition, obtaining a second command corresponding to the second partial track; and executing the second command.

In an example, the first command and the second command satisfy the following relationship:

the second command represents a repetitive execution of the first command; or the second command represents a specific parameter for execution when the first command is executed.

In an example, the first preset condition differs from the second preset condition.

In an example, the first preset condition comprises: the first partial track is a track with a corner shape.

In an example, the second preset condition comprises: a distance of the second partial track satisfies a first preset threshold or a touch time corresponding to the second partial track satisfies a second preset threshold.

In an example, the second preset condition comprises: the second partial track is a track with different shapes, and each shape of the track corresponds to a type of parameter.

On the other hand, provided is an input apparatus having a touch module, and the input apparatus comprises:

a first obtaining module for during a collection of a touch track on the touch module, when a first partial track of the touch track satisfies a first preset condition, obtaining a first command corresponding to the first partial track;

a first executing module for executing the first command;

a second obtaining module for during the collection of the touch track, when a second partial track following the first partial track satisfies a second preset condition, obtaining a second command corresponding to the second partial track; and a second executing module for executing the second command.

In an example, the first command and the second command satisfy the following relationship:

the second command represents a repetitive execution of the first command; or the second command represents a specific parameter for execution when the first command is executed.

In an example, the first preset condition differs from the second preset condition.

In an example, the first preset condition comprises: the first partial track is a track with a corner shape.

In an example, the second preset condition comprises: a distance of the second partial track satisfies a first preset threshold or a touch time corresponding to the second partial track satisfies a second preset threshold.

In an example, the second preset condition comprises: the second partial track is a track with different shapes, and each shape of the track corresponds to a type of parameter.

The embodiments of the present disclosure have the following advantageous effects:

during a collection of a touch track, when a first partial track of the touch track satisfies a first preset condition, a first command corresponding to the first partial track is obtained and the first command is executed; then, during the collection of the touch track, when a second partial track following the first partial track satisfies a second preset condition, a second command corresponding to the second partial track is obtained and the second command is executed, such that the above solution can take a special operation easy for the user to implement as a start to define the gesture when the input apparatus executes the first command, so as to achieve a quick identification and response of the operation of the user; then, when the second command is executed, a continuous response is made to the operation of the user after the identification of the operation of the used and before the completion of the operation of the user, only if fingers do not move away from the screen.

DETAILED DESCRIPTION

In order to make the technical problem to be solved in the embodiments, the technical solutions and the advantages of the present disclosure clearer, below will be a detailed description in combination with the accompanying figures and the specific embodiments.

The embodiments of the present disclosure are directed to the problem of being incapable of quickly identifying a gesture operation of the user on an input apparatus having a touch screen in the prior art. The embodiments of the present disclosure provide an input identification method and an input apparatus that can quickly identify the gesture operation of the user on the touch screen of the input apparatus, and can continue to perform corresponding operation after the identification of the gesture operation of the user and before the completion of the gesture operation.

Figure 1:
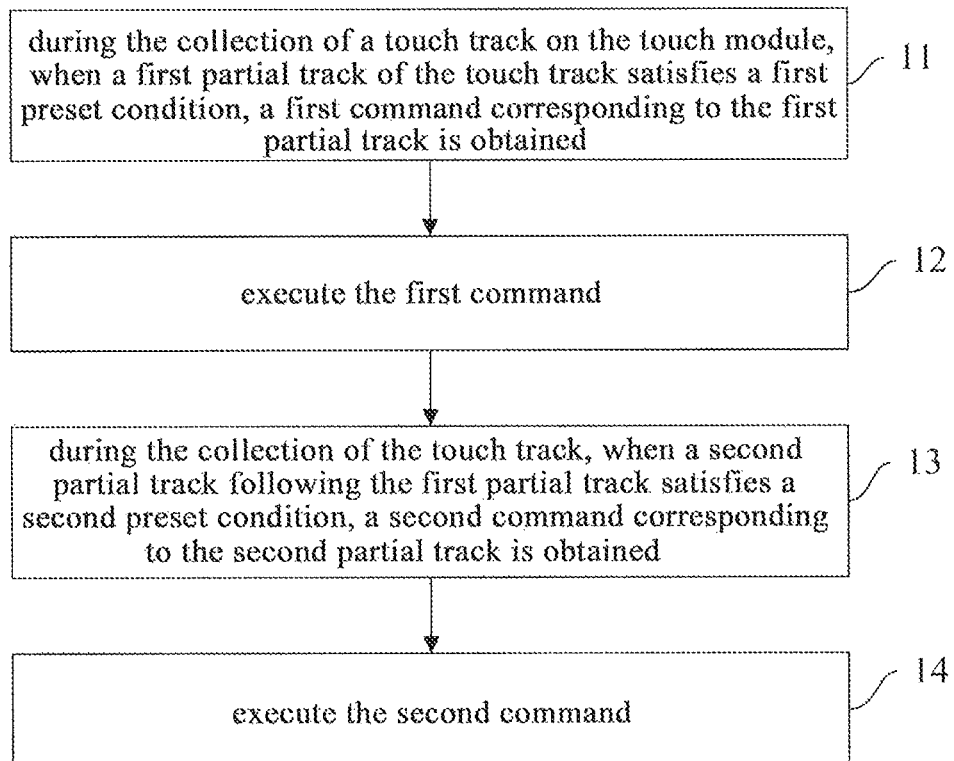
FIG. 1 is a flow illustrative diagram of an input identification method of embodiments of the present disclosure.

As shown in FIG. 1, an embodiment of the present disclosure provides an input identification method applied to an input apparatus having a touch module, and the method comprises:

Step 11, during a collection of a touch track on the touch module, when a first partial track of the touch track satisfies a first preset condition, obtaining a first command corresponding to the first partial track;

Step 12, executing the first command;

Step 13, during the collection of the touch track, when a second partial track following the first partial track satisfies a second preset condition, obtaining a second command corresponding to the second partial track; and Step 14, executing the second command.

During a collection of a touch track on the touch module, when a first partial track of the touch track satisfies a first preset condition, a first command corresponding to the first partial track is obtained and the first command is executed; then, during the collection of the touch track, when a second partial track following the first partial track satisfies a second preset condition, a second command corresponding to the second partial track is obtained and the second command is obtained, such that the above embodiment of the present disclosure can take a special operation easy for the user to implement as a start to define the gesture when the input apparatus executes the first command, so as to achieve a quick identification and response of the operation of the user; then, when the second command is executed, a continuous response is made to the operation of the user after the identification of the operation of the user and before the completion of the operation of the user, only if fingers do not move away from the screen.

In another embodiment of the disclosure, on the basis of steps 11-14, the first command and the second command satisfy the following relationship:

the second command represents a repetitive execution of the first command; or the second command represents a specific parameter for execution when the first command is executed.

Wherein, the second command representing a repetitive execution of the first command refers to: for example, when the first command is an instruction of drawing a graph, if the corresponding first partial track is a triangle, the second command represents a repetitive execution of the first command, then the second command should also be the instruction of drawing a graph, and then the second partial track corresponding to the second command may be another graph different from the triangle such as a circle or other irregular geometric graphs.

Wherein, the second command representing a specific parameter for execution when the first command is executed refers to: for example, if the first partial track of the first command is a triangle, the second partial track corresponding to the second command is a continuous touch track following the triangle, the continuous touch track differs from the first partial triangle track and may be a track of any random shape, for example a track formed by sliding towards any one of edges of the touch module of the input apparatus;

In a word, no matter whether the second command represents a repetitive execution of the first command or the second command represents a specific parameter for execution when the first command is executed, the second partial track corresponding to the second command continues the first partial track but differs from the first partial track.

For a parameter control application of the input apparatus, when the first partial track is formed, it represents a start-up of adjustment for the parameter; while when the second partial track is formed, it represents further performing a first type of adjustment or a second type of adjustment for the parameter after the start-up of the adjustment for the parameter.

In particular, for the parameter control application of the input apparatus, the specific embodiment can be described as follows:

For the volume control application of the input apparatus:

First Type:

For the volume control application of the input apparatus, when the first partial track is formed, it represents a start-up of volume increase, while when the second partial track is formed, it represents a control of continuously increasing volume; of course, when the first partial track is formed, it can represent a start-up of volume decrease, while when the second partial track is formed, it also can represent a continuous volume decrease.

For the volume control application of the input apparatus, when the first partial track is formed (for example, when a triangle track is formed), it represents a start-up of volume increase, while when the continuous touch track is performed, it can represent a continuous volume increase; likewise, the triangle formed in a direction opposite to the first partial track represents an instruction of starting up volume decrease, and when the continuous touch track following the triangle is formed, it represents a continuous volume decrease.

Figure 2A:
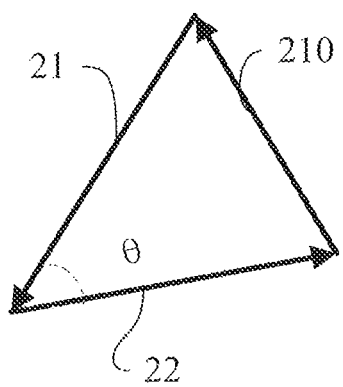
FIG. 2A is an illustrative diagram of an operation of a first embodiment when an input apparatus adjusts volume to increase.

Second Type:

Further, there is also an embodiment, that is, when the first partial track is formed (i.e., when the triangle is formed), it represents starting up a volume control program (but volume increase or decrease is not started up at this time), and then the following second partial track is an instruction of starting up the particular volume increase or decrease, for example, taking one of sides of the triangle as a boundary, the track upwards the screen is an instruction of volume increase, and the track downwards the screen is an instruction of volume decrease.

Wherein corresponding to the embodiment of the first type, on the basis of steps 11-14, the first preset condition comprises: the first partial track is a track with a corner shape; wherein the track with a corner shape can be in particular as shown in FIGS. 2A, 2B, 3A and 3B, in the process of the triangle being formed, the three sides of the triangle are a track formed from a first operation, a track formed from a second operation and a track formed from a third operation, respectively.

Wherein as shown in FIG. 2A, when an included angle between a direction of the first operation and a direction of the second operation is a first included angle, the start-up of volume increase is controlled according to the first operation and the second operation. A touch track formed from the first operation and the second operation is the first partial track, and a touch track formed from the third operation is the second partial track; after the first partial track is identified, the input apparatus starts up the first command of volume increase, and after the third operation, i.e., the second partial track, is identified, the input apparatus controls the volume to continuously increase; wherein the first included angle is the first included angle θ as shown in FIG. 2A, the track of the first operation is like side 21 of the first included angle θ, the direction of the first operation is the direction indicated by the arrow of the side 21, and the track of the second operation is like side 22 of the first included angle θ, the direction of the second operation is the direction indicated by the arrow of the side 22; the second partial track corresponding to the third operation is like a side 210 as shown in FIG. 2A, and the direction of the third operation is the direction indicated by the arrow of the side 210.

Figure 2B:
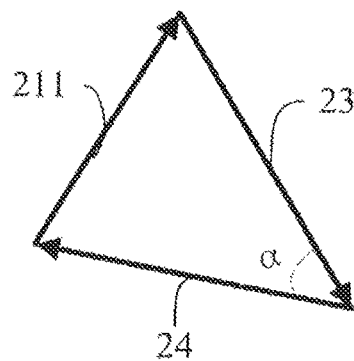
FIG. 2B is an illustrative diagram of an operation of a first embodiment when an input apparatus adjusts volume to decrease.

Correspondingly, when the included angle between the direction of the first operation and the direction of the second operation is a second included angle, the start-up of volume decrease is controlled according to the first operation and the second operation. In the control of volume decrease, likewise, the touch track formed from the first operation and the second operation is the first partial track, and the touch track formed from the third operation is the second partial track; after the first partial track is identified, the input apparatus starts up the first command of volume decrease, and after the third operation, i.e, the second partial track, is identified, the input apparatus controls the volume to continuously decrease; wherein the second included angle is the second included angle α as shown in FIG. 2B, the track of the first operation is like side 23 of the second included angle α, the direction of the first operation is the direction indicated by the arrow of the side 23, and the track of the second operation is like side 24 of the second included angle α, the direction of the second operation is the direction indicated by the arrow of the side 24; the direction of the third operation is the direction indicated by the arrow of side 211 as shown in FIG. 2B.

Wherein the direction of at least one side of the first included angle is different from that of at least one side of the second included angle, thus guaranteeing that the control of the volume increase and the volume decrease is controlled through different operation gestures; as shown in FIG. 2A, the direction of the side 21 of the first included angle θ is different from that of the side 23 of the second included angle α; or the direction of the side 21 of the first included angle θ is different from that of the side 24 of the second included angle α as shown in FIG. 2B; or the direction of the side 21 of the first included angle θ is different from directions of both the sides 23 and 24 of the second included angle α as shown in FIG. 2B; or the direction of the side 21 of the first included angle θ is different from that of the side 23 of the second included angle α as shown in FIG. 2B and the direction of the side 22 of the first included angle θ is different from that of the side 24 of the second included angle α as shown in FIG. 2B; or the direction of the side 22 of the first included angle θ is different from directions of both the sides 23 and 24 of the second included angle α as shown in FIG. 2B. No matter how to combine, the operations for controlling volume increase or decrease must be different.

Further, on the basis of the embodiments as shown in FIGS. 2A and 2B, when the direction of the first operation is a first non-horizontal direction and the direction of the second operation is a first direction of a horizontal line, a start-up of volume increase is controlled according to the first operation and the second operation. The touch track formed from the third operation is the second partial track. After the first partial track is identified, the input apparatus starts up the first command of volume increase; and after the third operation, i.e., the second partial track, is identified, the input apparatus controls the volume to continuously increase.

Wherein corresponding to the embodiment of the second type, on the basis of steps 11-14, when the first partial track is formed (for example, when the triangle is formed), it represents starting up a volume control program (but volume increase or decrease is not started up at this time), and then the following second partial track is an instruction of starting up the particular volume increase or decrease, for example, taking the side 22 of the triangle in FIG. 2A as a boundary, the track upwards the screen is an instruction of volume increase, and the track downwards the screen is an instruction of volume decrease.

Figure 3A:
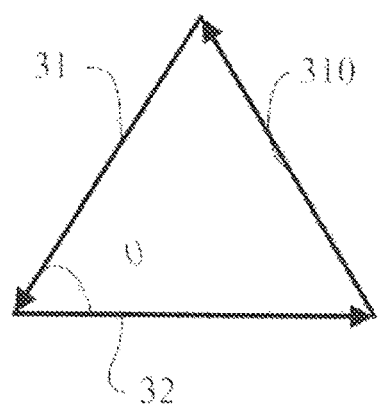
FIG. 3A is an illustrative diagram of an operation of a second embodiment when an input apparatus adjusts volume to increase.

In addition, for the embodiment of the first type, further, as shown in FIG. 3A, when the included angle between the direction of the first operation and the direction of the second operation is the first included angle, the start-up of volume increase is controlled according to the first operation and the second operation. The touch track formed from the first operation and the second operation is the first partial track, and the touch track formed from the third operation is the second partial track; after the first partial track is identified, the input apparatus starts up the first command of volume increase, and after the third operation, i.e., the second partial track, is identified, the input apparatus controls the volume to continuously increase; wherein the first included angle is the first included angle θ in FIG. 3A, the track of the first operation is like side 31 of the first included angle θ, the direction of the first operation is the first non-horizontal direction, i.e., the direction indicated by the arrow of the side 31 in FIG. 3A; the direction of the second operation is the first direction of the horizontal line, i.e., the direction indicated by the arrow of side 32 in FIG. 3A; and the direction of the third operation is the direction indicated by the arrow of side 310 in FIG. 3A.

Figure 3B:
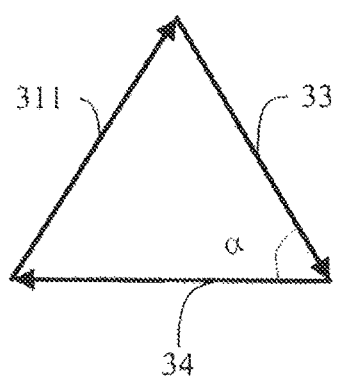
FIG. 3B is an illustrative diagram of an operation of a second embodiment when an input apparatus adjusts volume to decrease.

Correspondingly, as shown in FIG. 3B, when the direction of the first operation is a second non-horizontal direction and the direction of the second operation is a second direction of a horizontal line, a start-up of volume decrease is controlled according to the first operation and the second operation. The touch track formed from the third operation is the second partial track. After the first partial track is identified, the input apparatus starts up the first command of volume decrease; and after the third operation, i.e., the second partial track, is identified, the input apparatus controls the volume to continuously decrease; wherein the direction of the first operation is the second non-horizontal direction, i.e., the direction indicated by the arrow of side 33 in FIG. 3B; the direction of the second operation is the second direction of the horizontal line, i.e., the direction indicated by the arrow of side 34 in FIG. 3B; and the direction of the third operation is the direction indicated by the arrow of side 311 in FIG. 3B.

Wherein the first direction of the horizontal line is opposite to the second direction of the horizontal line, that is, the direction of the side 32 is opposite to that of the side 34. Such operation gesture is easier to be quickly identified, and also it is easy for the user to operate.

Further on the basis of the embodiments as shown in FIGS. 3A and 3B, it can also be modified to another embodiment of the present disclosure: the first non-horizontal direction is different from the second non-horizontal direction; that is, the direction indicated by the side 31 is different from that indicated by the side 33. Such operation gesture also makes it easy for the user to operate and enables the input apparatus to quickly identify the gesture operation of the user, thus giving convenience to the user.

Correspondingly, corresponding to the embodiment of the second type, on the basis of steps 11-14, when the first partial track is formed (for example, when the triangle is formed), it represents starting up a volume control program (but volume increase or decrease is not started up at this time), and then the following second partial track is an instruction of starting up the particular volume increase or decrease, for example, taking the second side 32 of the triangle in FIG. 3A as a boundary, the track upwards the screen is an instruction of volume increase, and the track downwards the screen is an instruction of volume decrease. Of course, if the second side 32 of the triangle is parallel relative to the left and right boundaries of the screen, the second side 32 can also be taken as the boundary. At this time the track left towards the screen is an instruction of volume increase, and the track right towards the screen is an instruction of volume decrease; or taking the second side 32 as a boundary, the track right towards the screen is an instruction of volume increase, and the track left towards the screen is an instruction of volume decrease.

For the gesture operation track of the triangle, it is easy for the program to quickly identify and it is easy for the user to operate, because the start of the triangle is a straight line having certain angle relative to the horizontal direction, and changes the direction at the vertex of the triangle into a straight line having another angle relative to the horizontal direction. As shown in FIGS. 2A, 2B, 3A and 3B, drawing a straight line is easy for the user to operate. Moreover, the triangle is a closed shape, the user can repeat the operation in a case of the fingers not moving away from the screen.

As for the gesture operation of controlling the volume to continuously increase as shown in FIGS. 2A and 3A, the start of the gesture is a straight line having certain angle (for examine 45°±15) relative to the horizontal direction. According to the touch track, it can be quickly determined whether the completed track is a straight line as well as the included angle relative to the horizontal direction, so as to determine whether it is the operation of volume increase. After identification, the user continues to draw the triangle, and the accuracy of the drawn track will not influence the identification result. For the gesture operation of volume decrease, as shown in FIGS. 2B and 3B, it is the same.

If it needs to further enhance accuracy of identification and avoid misidentification with up, down, left and right operations, when it is detected that the track drawn by the user changes into the horizontal direction, i.e., identifying that the second operation is a straight line in the horizontal direction, as shown in FIGS. 3A and 3B, it is then determined identifying as the operation of adjusting the volume to increase or adjusting the volume to decrease.

After the operation of adjusting the volume to increase or adjusting the volume to decrease is identified, a response is started to be made immediately. Before the completion of the operation of the user (that is, before the fingers of the user move away from the screen), the volume is continuously increased or decreased.

In order to further improve the experience of the user, the decreasing or increasing speed can be multiplied in the process of continuously decreasing or increasing the volume, so as to quickly satisfy the user's need for adjusting the volume.

In addition, in another embodiment of the present disclosure, on the basis of the steps 11-14, the second preset condition comprises: the second partial track is a track with different shapes, and each shape of the track corresponds to a type of parameter.

Figure 4:
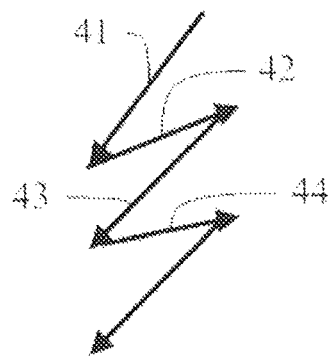
FIG. 4 is an illustrative diagram of an operation of a third embodiment when an input apparatus adjusts volume to increase or decrease.
Figure 5:
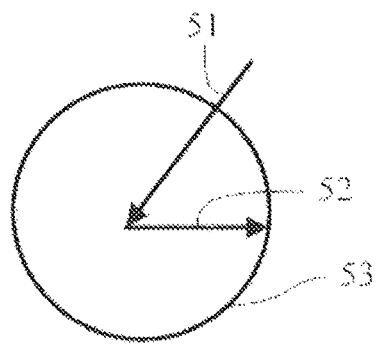
FIG. 5 is an illustrative diagram of an operation of a fourth embodiment when an input apparatus adjusts volume to increase or decrease.

When the first partial track is a corner shape, and the corner can be the corner as shown in FIGS. 4 and 5, the second partial track is a track with different shapes, and each shape of the track corresponds to a type of parameter, for example, the second partial track can be the track formed from the third operation as shown in FIGS. 2A, 2B, 3A and 3B and can further be the second partial track formed from the third operation as shown in FIGS. 4 and 5. In the operation gesture as shown in FIG. 4:

The track of the first operation is like side 41, and the direction of the first operation is the direction indicated by the arrow of the side 41;

The track of the second operation is like side 42, and the direction of the second operation is the direction indicated by the arrow of the side 42;

The first operation and the second operation connecting together corresponds to the first partial track;

The track of the third operation is like side 43, and the direction of the third operation is the direction indicated by the arrow of the side 43;

A fourth operation and a fifth operation and so on can further be comprised, wherein the track of the fourth operation is like side 44, and the direction of the fourth operation is the direction indicated by the arrow of the side 44; wherein the track corresponding to the third operation is the second partial track. Of course, the second partial track can further comprise tracks formed from the fourth operation and the fifth operation and so on.

The first operation, the second operation, the third operation, the fourth operation and the fifth operation and so on herein are operations continuously in sequence. The identification is a real-time identification, and a response can be made, i.e., determining whether to increase or decrease volume, when at least the second operation is identified (i.e., the first partial track ends).

In the operation gesture as shown in FIG. 5:

The track of the first operation is like side 51, and the direction of the first operation is the direction indicated by the arrow of the side 51; the track of the second operation is like side 52, and the direction of the second operation is the direction indicated by the arrow of the side 52; the track of the third operation is the track as shown in circle 53 wherein the tracks formed from the first operation and the second operation correspond to the first partial track (corresponding to the first command, which represents the start-up of volume increase or decrease), and the track formed from the third operation corresponds to the second partial track (corresponding to the second command, which represents a continuous volume increase or decrease). The direction of the third operation can be an anti-clockwise direction, being easier to operate, and of course, it can be a clockwise direction.

The operation gestures as shown in FIGS. 4 and 5 are other similar gestures (for example the continuous operation is to draw a circle or a fold line) with the included angle formed between the first operation and the second operation as a start. A quick identification and real-time response can also be achieved through the above similar modes.

It needs to be specified that: the operation gestures as shown in FIGS. 2A, 2B, 3A, 3B, 4 and 5 are merely illustrated to specify the solutions of the embodiments of the present disclosure; the present disclosure is not limited to the operations and the operation directions as shown in the figures, and may have other operation gestures only if the operation gestures for controlling volume increase or decrease are different when the present disclosure is defined.

In addition, all the embodiments described above take the volume parameter as the adjusted object of the input apparatus. Of course, other parameters of the input apparatus can be adjusted, such as the parameters of the brightness of the screen, the display color of the screen, the resolution of the screen or scrolling of the screen and so on by adopting the solutions described in the above embodiments. The same technical effect can be achieved, details omitted.

In addition, in the embodiments described above, in the process of controlling increase or decrease of the volume or other parameters, the second preset condition comprises: the distance of the second partial track satisfies the first preset threshold or the touch time corresponding to the second partial track satisfies the second preset threshold, i.e., adjusting the volume or other parameters according to the distance of the second partial track, for example, the longer the distance of the second partial track is, the more the volume increase is. The first preset threshold can be a track distance corresponding to the maximum volume of the input apparatus. Of course, the volume or other parameters can be adjusted according to the touch time corresponding to the second partial track, for example, the longer the time of the second partial track continuing on the touch module is, the more the volume increase is. The second present threshold can be a reasonable time value, such as 5 S or 10 S, which can be randomly set according to the preference of the user.

To sum up, the embodiments of the present disclose make a response when a determined included angle formed between the first operation and the second operation is identified (that is, when the first partial track is identified), and make a continuous response and control the volume and other parameters when the second partial track is identified, which has characteristics of quick and real-time response, i.e., being capable of quickly identifying the operation gesture of the user, and does not need to wait to find a matched graph from the graphics library until all the operations of the user are completed, and then perform the corresponding operation, thus giving convenience to the use of the user.

Figure 6:
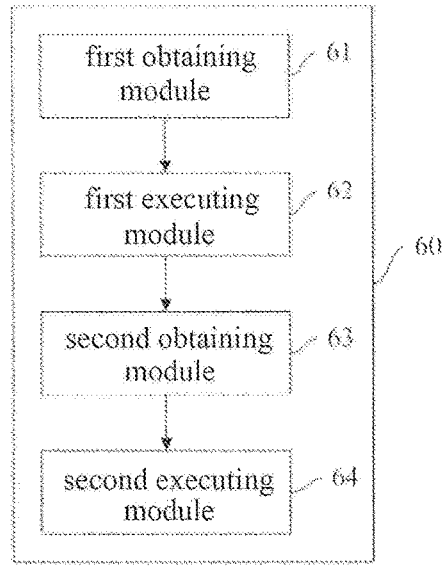
FIG. 6 is an illustrative diagram of a structure of an input apparatus of embodiments of the present disclosure.

As shown in FIG. 6, the embodiment of the present disclosure further provides an input apparatus 60 having a touch module. The input apparatus comprises:

a first obtaining module 61 for during a collection of a touch track on the touch module, when a first partial track of the touch track satisfies a first preset condition, obtaining a first command corresponding to the first partial track;

a first executing module 62 for executing the first command;

a second obtaining module 63 for during the collection of the touch track, when a second partial track following the first partial track satisfies a second preset condition, obtaining a second command corresponding to the second partial track;

a second executing module 64 for executing the second command.

Wherein the first command and the second command satisfies the following relationship:

the second command represents a repetitive execution of the first command; or the second command represents a specific parameter for execution when the first command is executed.

Wherein the first preset condition differs from the second preset condition.

Wherein the first preset condition comprises: the first partial track is a track with a corner shape. Its specific implementations are as shown in FIGS. 2A, 2B, 3A, 3B, 4 and 5, but not limited to these forms. All implementations of the above method are applicable to the present apparatus embodiment and can achieve the same technical effect, details omitted.

Wherein the second preset condition comprises: a distance of the second partial track satisfies a first preset threshold or a touch time corresponding to the second partial track satisfies a second preset threshold.

Wherein the second preset condition further comprises: the second partial track is a track with different shapes, and each shape of the track corresponds to a type of parameter.

With respect to each of the technical features of the input apparatus, the specific implementations of the method described above are applicable to be used in the present apparatus embodiment and can achieve the same technical effect. That is, the input apparatus also makes a response when a determined included angle formed between the first operation and the second operation is identified (that is, when the first partial track is identified), and controls the volume and other parameters when the second partial track is identified, which has characteristics of quick and real-time response, i.e., being capable of quickly identifying the operation gesture of the user, and does not need to wait to find a matched graph from the graphics library until all the operation of the user are completed, and then perform the corresponding operation, thus giving convenience to the use of the user.

It needs to be specified: the input apparatus of the present disclosure can be in particular any kind of handheld terminal device having a touch module such as a touch screen. The touch module is used for sensing the touch track of the user on the touch module. A corresponding obtaining module and executing module are added inside the handheld terminal device, such as the first obtaining module, the first executing module, the second obtaining module and the second executing module and so on, being used for making a response when a determined angle formed between the first operation and the second operation is identified (i.e., when the first partial track is identified), which can quickly identify the gesture operation of the user on the touch module. Moreover, when the third operation is further identified (i.e., when the second partial track is identified), the volume or other parameters of the handheld terminal device can be adjusted, for example, adjusting the volume to increase or decrease and adjusting the brightness of the screen to increase or decrease and so on, thus giving convenience to the use of the user.

The above are described the preferred embodiments of the present disclosure. It should be pointed out that for those skilled in the art, many modifications and retouches can be made without departing from the principle and scope of the present disclosure, and such modifications and retouches should be considered as falling into the scope of the present disclosure.

What is claimed is:

1. An input identification method applied to an input apparatus having a touch module, comprising:
   during a collection of a touch track of fingers on the touch module, when a first partial track of the touch track satisfies a first preset condition, obtaining a first command corresponding to the first partial track;
   executing the first command;
   during the collection of the touch track, when a second partial track continuously following the first partial track satisfies a second preset condition, obtaining a second command corresponding to the second partial track; and
   executing the second command, wherein the first command represents adjusting a degree or amount of a parameter of the input apparatus to be more or less, and compared with the first command, the second command represents adjusting a degree or an amount of the same parameter of the input apparatus to be further more or further less, the first partial track comprises a first operation and a second operation, and the second operation has a first included angle that is not equal to zero degree with respect to the first operation; the second partial track comprises a third operation, and the third operation has a second included angle that is not equal to zero degree with respect to the second operation,
   wherein when the second command is executed, a continuous response is made to the third operation after identification of the third operation and before the completion of the third operation, only if the fingers do not move away from the touch module, and the parameter is a volume of input apparatus, the first command represents a start-up of volume increase or volume decrease, the second command represents a control of continuously increasing or decreasing volume, and
   wherein when a direction of the first operation is a first non-horizontal direction, a direction of the second operation is a first direction of a horizontal line, the first command represents the start-up of volume increase, and when the direction of the first operation is a second non-horizontal direction, the direction of the second operation is a second direction of a horizontal line, the first command represents the start-up of volume decrease, the first direction of the horizontal line is opposite to the second direction of the horizontal line so that the volume increase and volume decrease can be quickly identified.

2. The input identification method according to claim 1, wherein the first preset condition differs from the second preset condition.

3. The input identification method according to claim 1, wherein the first preset condition comprises: the first partial track is a track with a corner shape.

4. The input identification method according to claim 3, wherein the second preset condition comprises: the second partial track is a track with different shapes, and each shape of the track corresponds to a type of parameter.

5. The input identification method according to claim 1, wherein the second preset condition comprises: a distance of the second partial track satisfies a first preset threshold or a touch time corresponding to the second partial track satisfies a second preset threshold.

6. An input apparatus having a touch module, comprising:
   a first obtaining module for during a collection of a touch track of fingers on the touch module, when a first partial track of the touch track satisfies a first preset condition, obtaining a first command corresponding to the first partial track;
   a first executing module for executing the first command;
   a second obtaining module for during the collection of the touch track, when a second partial track continuously following the first partial track satisfies a second preset condition, obtaining a second command corresponding to the second partial track; and
   a second executing module for executing the second command, wherein the first command represents adjusting a degree or an amount of a parameter of the input apparatus to be more or less, and compared with the first command, the second command represents adjusting the degree or amount of the same parameter of the input apparatus to be further more or further less, the first partial track comprises a first operation and a second operation, and the second operation has a first included angle that is not equal to zero degree with respect to the first operation; the second partial track comprises a third operation, and the third operation has a second included angle that is not equal to zero degree with respect to the second operation,
   wherein when the second command is executed, a continuous response is made to the third operation after identification of the third operation and before the completion of the third operation, only if the fingers do not move away from the touch module, and the parameter is a volume of input apparatus, the first command represents a start-up of volume increase or volume decrease, the second command represents a control of continuously increasing or decreasing volume, and
   wherein when a direction of the first operation is a first non-horizontal direction, a direction of the second operation is a first direction of a horizontal line, the first command represents the start-up of volume increase, and when the direction of the first operation is a second non-horizontal direction, the direction of the second operation is a second direction of a horizontal line, the first command represents the start-up of volume decrease, the first direction of the horizontal line is opposite to the second direction of the horizontal line so that the volume increase and volume decrease can be quickly identified.

7. The input apparatus according to claim 6, wherein the first preset condition differs from the second preset condition.

8. The input apparatus according to claim 6, wherein the first preset condition comprises: the first partial track is a track with a corner shape.

9. The input apparatus according to claim 8, wherein the second preset condition comprises: the second partial track is a track with different shapes, and each shape of the track corresponds to a type of parameter.

10. The input apparatus according to claim 6, wherein the second preset condition comprises: a distance of the second partial track satisfies a first preset threshold or a touch time corresponding to the second partial track satisfies a second preset threshold.

* * * * *